US012559645B2

(12) United States Patent
Kim

(10) Patent No.: US 12,559,645 B2
(45) Date of Patent: Feb. 24, 2026

(54) CLEAR COATING COMPOSITION FOR REDUCING DUST

(71) Applicants: HYUNDAI MOTOR COMPANY, Seoul (KR); KIA CORPORATION, Seoul (KR)

(72) Inventor: Hwan Oh Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 567 days.

(21) Appl. No.: 18/072,957

(22) Filed: Dec. 1, 2022

(65) Prior Publication Data

US 2023/0174815 A1 Jun. 8, 2023

(30) Foreign Application Priority Data

Dec. 3, 2021 (KR) ........................ 10-2021-0171461

(51) Int. Cl.
C09D 133/08 (2006.01)

(52) U.S. Cl.
CPC .................................. C09D 133/08 (2013.01)

(58) Field of Classification Search
CPC ...... C09D 133/08; C09D 5/24; C09D 133/00; C09D 7/20; C09D 7/45; C09D 7/61; C09D 7/70; C08K 2201/011; C08K 2201/017; C08K 3/041; C08K 2201/003; C08K 2201/004; C08L 2201/04; C08L 2201/10; C08L 61/28

See application file for complete search history.

(56) References Cited

U.S. PATENT DOCUMENTS

| | | | |
|---|---|---|---|
| 2011/0031443 A1 | 2/2011 | Park et al. | |
| 2013/0165556 A1* | 6/2013 | Noh ..................... | C09D 133/04 |
| | | | 524/106 |
| 2017/0197382 A1* | 7/2017 | Morita .................... | B32B 37/14 |

FOREIGN PATENT DOCUMENTS

JP 2007297255 A * 11/2007

OTHER PUBLICATIONS

Machine translation JP-2007297255-A (Year: 2007).*

* cited by examiner

*Primary Examiner* — Doris L Lee

(74) *Attorney, Agent, or Firm* — Lempia Summerfield Katz LLC

(57) ABSTRACT

A clear coating composition for reducing dust is provided. More specifically, a clear coating composition capable of reducing dust in a coating film is provided by applying a single-walled carbon nanotube to prevent static electricity, and partially prevent dust adsorption while reducing the generation of static electricity as much as possible, and contribute to the improvement of vehicle merchantability by removing dust during driving.

9 Claims, 5 Drawing Sheets

CLEAR COATING COMPOSITION FOR REDUCING DUST

CROSS REFERENCE TO RELATED APPLICATION

The present application claims priority to Korean Patent Application No. 10-2021-0171461, filed Dec. 3, 2021, the entire content of which is incorporated herein for all purposes by this reference.

BACKGROUND

1. Field

The present disclosure relates to a clear coating composition for reducing dust. More specifically, the purpose of the present disclosure relates to a clear coating composition capable of reducing dust in a coating film having a single-walled carbon nanotube configured to prevent static electricity, and partially prevent dust adsorption while reducing the generation of static electricity as much as possible, and contribute to the improvement of vehicle merchantability by removing dust during driving.

2. Description of the Related Art

The automotive exterior coating film may include four layers: electrodeposited layer, an intermediate coating, base layer, and a clear layer. There are functions assigned to each layer, but among them, the clear layer is a transparent and uniform top layer, which is highly related to the appearance of the vehicle and can be recognized immediately by consumers when they see the car. However, pollutants such as dust and yellow sand in the air accumulate on the surface of the vehicle coating film over time, and in particular, the pollutants adsorbed by static electricity do not fall off easily. The pollutants on the black-colored vehicles tend to be more visible to the eye, so they tend to wash their cars frequently.

The clear layer is formed of a polymer material, and thus even when washing, dust in the air is adsorbed on the surface of the coating film due to static electricity generation due to wiping and thus does not fall off unless it is artificially cleaned. It is practically impossible to prevent contaminants from accumulating on the surface of the coating film of a vehicle exposed to the outside unless a cover is applied, and there is a limit to removing static electricity generated on the surface of the coating film by wiping.

The statements in this BACKGROUND section merely provide background information related to the present disclosure and may not constitute prior art.

SUMMARY

The present disclosure relates to a clear coating composition for reducing dust. The purpose of the present disclosure is to provide a clear coating composition capable of reducing dust in a coating film by adding a single-walled carbon nanotube used for antistatic property in various industries to prevent static electricity, partially prevent dust adsorption while reducing the generation of static electricity as much as possible, and contribute to the improvement of vehicle merchantability by removing dust during driving.

The objectives of the present disclosure are not limited to the objective mentioned above. The objectives of the present disclosure become clearer from the following description and are realized by means and combinations thereof described in the claims.

The clear coating composition, according to the present disclosure, may include 45% to 55% by weight of an acrylic resin, 20% to 30% by weight of a melamine resin, 0.2% to 0.3% by weight of single-walled carbon nanotubes, 0.5% to 1.0% by weight of a dispersion stabilizer, 8% to 13% by weight of additives, and 12% to 25% by weight of a solvent.

The single-walled carbon nanotubes may have a diameter in a range of 1 nanometer (nm) to 2 nm.

The single-walled carbon nanotubes may have a length in a range of 5 micrometers (μm) to 50 μm.

The dispersion stabilizer may include a polycarboxylic acid-modified compound.

The additive may include a light stabilizer, a surface conditioning agent, an anti-flow agent, or any combination thereof.

The additive includes 2% to 3% by weight of a light stabilizer, 2% to 4% by weight of a surface conditioning agent, and 4% to 6% by weight of an anti-flow agent.

The solvent may include 3% to 6% by weight of an ether-based solvent, 1% to 4% by weight of an alcohol-based solvent, and 8% to 15% by weight of an aromatic hydrocarbon-based solvent.

The clear coating composition may have a surface resistance of $10^6 \Omega$ or less.

The clear coating composition may have a gloss of 85 or more at 20°.

The clear coating composition for reducing dust applies single-walled carbon nanotubes having a diameter of 1.6 nm±0.4 nm and a length in a range of 5 μm to 50 μm, thereby exhibiting the dust reduction performance of a clear coating film without impairing gloss and coating film properties.

In addition, the material can be used for various parts, such as aluminum wheels in addition to painting the body.

The effects of the present disclosure are not limited to the effects mentioned above. It should be understood that the effects of the present disclosure include all effects that can be inferred from the following description.

BRIEF DESCRIPTION OF THE DRAWINGS

In order that the disclosure may be well understood, there are now described various forms thereof, given by way of example, reference being made to the accompanying drawings, in which.

DETAILED DESCRIPTION

Figure 1:
FIG. 1 shows a result of a dust reduction performance test for a clear coating composition prepared with the composition of Example 1.

The above objectives, other objectives, features, and advantages of the present disclosure are understood through the following embodiments in conjunction with the accompanying drawings. However, the present disclosure is not limited to the embodiments described herein and may be embodied in other forms. Rather, the embodiments introduced herein are provided so that the disclosed content may be thorough and complete, and the spirit of the present disclosure may be sufficiently conveyed to those having ordinary skill in the art.

Like reference numerals have been used for like elements in describing each figure. In the accompanying drawings, the dimensions of the structures are enlarged than the actual size for clarity of the present disclosure. Terms such as first, second, etc., may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The singular expression includes the plural expression unless the context clearly dictates otherwise.

In this specification, the terms "include" or "have" should be understood to designate that one or more of the described features, numbers, steps, operations, components, or a combination thereof exist, and the possibility of addition of one or more other features or numbers, operations, components, or combinations thereof should not be excluded in advance. Also, when a part of a layer, film, region, plate, etc., is said to be "on" another part, this includes not only the case where it is "on" another part but also the case where there is another part in between. Conversely, when a part of a layer, film, region, plate, etc., is said to be "under" another part, this includes not only cases where it is "directly under" another part but also cases where another part is in the middle.

Unless otherwise specified, all numbers, values, and/or expressions expressing quantities of ingredients, reaction conditions, polymer compositions, and formulations used herein contain all numbers, values, and/or expressions in which such numbers occur in obtaining such values, among others. Because they are approximations reflecting various uncertainties in the measurement, it should be understood as being modified by the term "about" in all cases. In addition, when a numerical range is disclosed in this disclosure, this range is continuous and includes all values from the minimum to the maximum value containing the maximum value of this range unless otherwise indicated. Furthermore, when such a range refers to an integer, all integers, including the minimum value to the maximum value containing the maximum value, are included unless otherwise indicated.

The clear coating composition may include an acrylic resin, a melamine resin, a single-walled carbon nanotube, a dispersion stabilizer, an additive, and a solvent.

Each component constituting the clear coating composition, according to the present disclosure, is described in more detail below.

(A) Acrylic Resin

The acrylic resin may advantageously improve the coating film adhesion.

The acrylic resin may include a polymerized acrylic monomer such as methyl acrylate, ethyl acrylate, propyl acrylate, or the like.

The acrylic resin may be in a range of 45% to 55% by weight with respect to the total weight of the clear coating composition.

When the amount of the acrylic resin is less than 45% by weight, main physical properties such as interlayer adhesion may be deteriorated, and when the amount of the acrylic resin exceeds 55% by weight, a problem of reduced workability may occur.

(B) Melamine Resin

The melamine resin may advantageously improve the curability of the paint.

The melamine resin may be in a range of 20% to 30% by weight with respect to the total weight of the clear coating composition.

When the amount of the melamine resin is less than 20% by weight, the reactivity is lowered, and it is resulted in decrease the hardness of the coating film. When the amount of the melamine resin exceeds 30% by weight, there may be a problem that the sanding workability is reduced due to overcuring.

(C) Single-Walled Carbon Nanotubes

The single-walled carbon nanotube may advantageously exhibit dust reduction performance without impairing gloss and coating film properties.

The single-walled carbon nanotubes may be in a range of 0.2% to 0.3% by weight with respect to the total weight of the clear coating composition.

When the content of the single-walled carbon nanotubes is less than 0.2% by weight, it is difficult to exhibit dust reduction properties, and when the content of the single-walled carbon nanotubes exceeds 0.3% by weight, there may be a problem in that gloss and repainting adhesion are deteriorated.

The single-walled carbon nanotube may have a diameter in a range of 1 nm to 2 nm.

The single-walled carbon nanotube may have a length in a range of 5 $\mu$m to 50 $\mu$m.

When the length of the single-walled carbon nanotube is less than 5 $\mu$m, the effect of reducing dust reduction property is decreased, and when the length of the single-walled carbon nanotube exceeds 50 $\mu$m, clogging of the paint sprayer filter may occur during painting.

(D) Dispersion Stabilizer

The dispersion stabilizer may advantageously prevent aggregation between single-walled carbon nanotubes.

The dispersion stabilizer may include a polycarboxylic acid-modified compound.

The dispersion stabilizer may be in a range of 0.5% to 1.0% by weight with respect to the total weight of the clear coating composition.

When the content of the dispersion stabilizer is less than 0.5% by weight, the dust reduction property is lowered due to pigment aggregation, and when the content of the dispersion stabilizer exceeds 1.0% by weight, there may be a problem affecting the adhesion between the coating layers.

(E) Additives

The additive may be in a range of 8% to 13% by weight with respect to the total weight of the clear coating composition.

The additive may include a light stabilizer, a surface conditioning agent, an anti-flow agent, or a combination thereof.

The light stabilizer may advantageously secure weather resistance and may include a hindered amine light stabilizer (HALS)-based light stabilizer.

The light stabilizer may be in a range of 2% to 3% by weight with respect to the total weight of the clear coating composition.

When the content of the light stabilizer is less than 2% by weight, weather resistance is deteriorated, and when the content of the light stabilizer exceeds 3% by weight, there may be a problem affecting the gloss.

The surface conditioning agent may advantageously improve the smoothness of the paint and may include a silicone-modified acrylic resin.

The surface conditioning agent may be in a range of 2% to 4% by weight with respect to the total weight of the clear coating composition.

When the content of the surface conditioning agent is less than 2% by weight, the smoothness of the paint is lowered, and when the content of the surface conditioning agent exceeds 4% by weight, a problem in which the sand mark (hiding property) is lowered may occur.

The anti-flow agent may advantageously improve the thixo-property of the paint. The anti-flow agent may be an acrylic derivative including an acrylic group or an acrylic compound, modified urethane that is partially modified, or the like.

The anti-flow agent may be in a range of 4% to 6% by weight with respect to the total weight of the clear coating composition.

When the content of the anti-flow agent is less than 4% by weight, the sagging prevention performance (SAG) of the paint may be degraded, and when the content of the anti-flow agent exceeds 6% by weight, the smoothness of the paint may be degraded.

(F) Solvent

The solvent may advantageously impart paint workability.

The solvent may be in a range of 12% to 25% by weight with respect to the total weight of the clear coating composition.

When the content of the solvent is less than 12% by weight, the viscosity of the paint increases and the workability of the painting decreases, and when the content of the solvent exceeds 25% by weight, the viscosity decreases, and the workability of the painting decreases.

The solvent may include 3% to 6% by weight of an ether-based solvent, 1% to 4% by weight of an alcohol-based solvent, and 8% to 15% by weight of an aromatic hydrocarbon-based solvent.

The ether-based solvent may include diphenyl ether, methyl cellosolve, butyl cellosolve, or the like.

The alcohol-based solvent may include methanol, ethanol, butanol, or the like.

The aromatic hydrocarbon-based solvent may include toluene, xylene, benzene, or the like.

The clear coating composition may have a surface resistance of $10^6\Omega$ or less.

The clear coating composition may have a gloss of 85 or more measured at 200.

Hereinafter, the present disclosure is described in detail with reference to the following Examples and Comparative Examples. However, the technical spirit of the present disclosure is not limited or limited thereto.

Example 1 and Comparative Examples 1 to 4

A clear coating composition for reducing dust was formed with the composition shown in Table 1 below.

TABLE 1

| Ingredients (Unit: weight %) | Example 1 | Comp. Example 1 | Comp. Example 2 | Comp. Example 3 | Comp. Example 4 |
|---|---|---|---|---|---|
| Acrylic (acrylic resin for paint) | 49.7 | 50.0 | 49.7 | 49.5 | 49.5 |
| Melamine (melamine | 24.9 | 25.0 | 24.5 | 24.8 | 25.4 |

TABLE 1-continued

| Ingredients (Unit: weight %) | | Example 1 | Comp. Example 1 | Comp. Example 2 | Comp. Example 3 | Comp. Example 4 |
|---|---|---|---|---|---|---|
| resin for paint) | | | | | | |
| single-walled carbon nanotube (Diameter: 1.6 nm ± 0.4, 5 μm to 50 μm in length) | | 0.2 | — | 0.4 | 0.1 | 0.2 |
| Dispersion stabilizer (polycarboxylic acid modified product) | | 0.6 | • | 0.6 | 0.6 | — |
| Additive | Light stabilizer (HALS) | 2.3 | 2.3 | 2.3 | 2.3 | 2.3 |
| | Surface conditioning agent (silicone modified acrylic) | 3.0 | 3.0 | 3.0 | 3.0 | 3.0 |
| | Anti-flow agent (acrylic derivative) | 4.3 | 4.3 | 4.3 | 4.3 | 4.3 |
| Solvent | Ether-based | 3.1 | 3.1 | 3.1 | 3.1 | 3.1 |
| | Alcohol-based | 2.1 | 2.1 | 2.1 | 2.1 | 2.1 |
| | Aromatic hydrocarbon-based | 9.8 | 10.2 | 10.0 | 10.2 | 10.1 |
| Total | | 100.0 | 100.0 | 100.0 | 100.0 | 100.0 |

Experimental Example

The surface resistance, gloss, and repainting adhesion of Example 1 and Comparative Examples 1 to 4 were measured. When the surface resistance is less than $10^6\Omega$, dust reduction properties are expressed, the gloss is excellent when it is 85 or more, and the repainting adhesion is excellent when it is M-2.5 or more.

The results are shown in Table 2.

TABLE 2

| Evaluation item | Requirements | Evaluation results | | | | |
|---|---|---|---|---|---|---|
| | | Example 1 | Comp. Example 1 | Comp. Example 2 | Comp. Example 3 | Comp. Example 4 |
| Surface resistance (Ω) | at $10^6$ below Ω Dust reduction. *Using a surface resistance meter | 105.7 | 1013.1 | 105.0 | 109.2 | 1010.2 |
| Glossiness | 85 or more (at 20°) *Using a gloss meter | 88.0 | 88.5 | 83.2 | 88.3 | 87.6 |
| Repainting Adhesion | M-2.5 or higher *Using the check-eye method | M-1.0 | M-1.0 | M-5.0 | M-1.0 | M-1.0 |

Figure 2A:
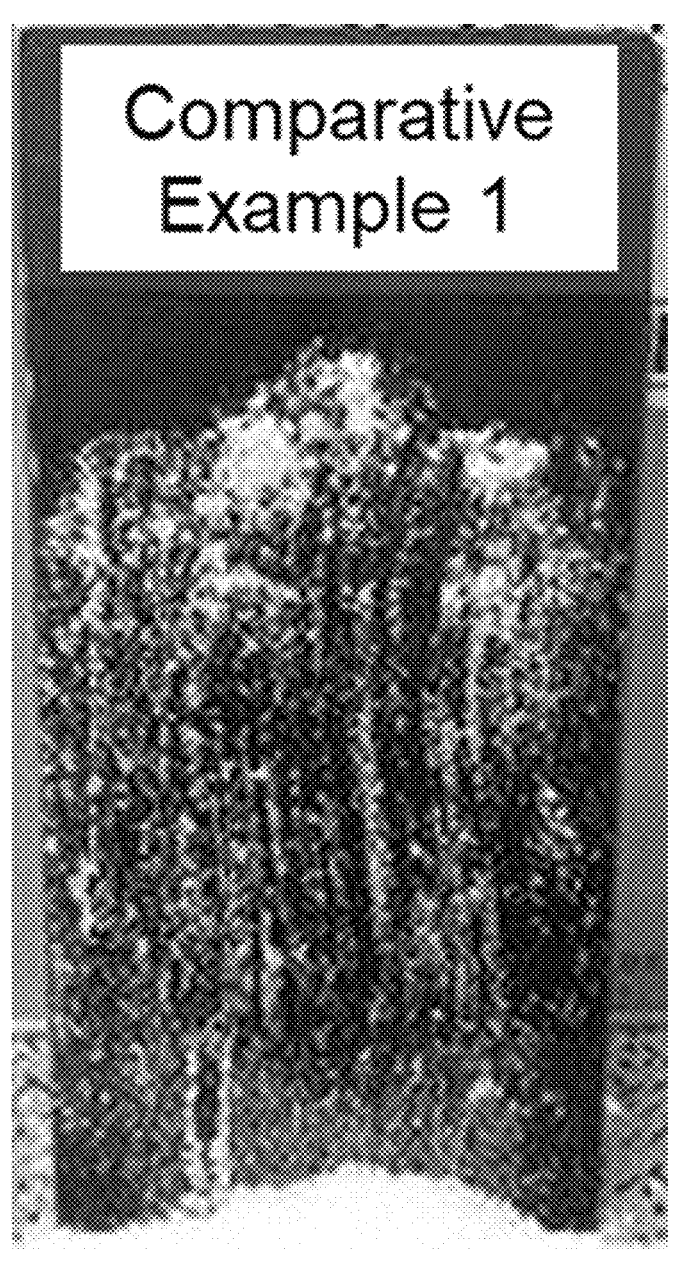
FIG. 2A shows a result of a dust reduction performance test for a clear coating composition prepared with the composition of Comparative Example 1.
Figure 2B:
FIG. 2B shows a result of a dust reduction performance test for a clear coating composition prepared with the composition of Comparative Example 2.
Figure 2C:
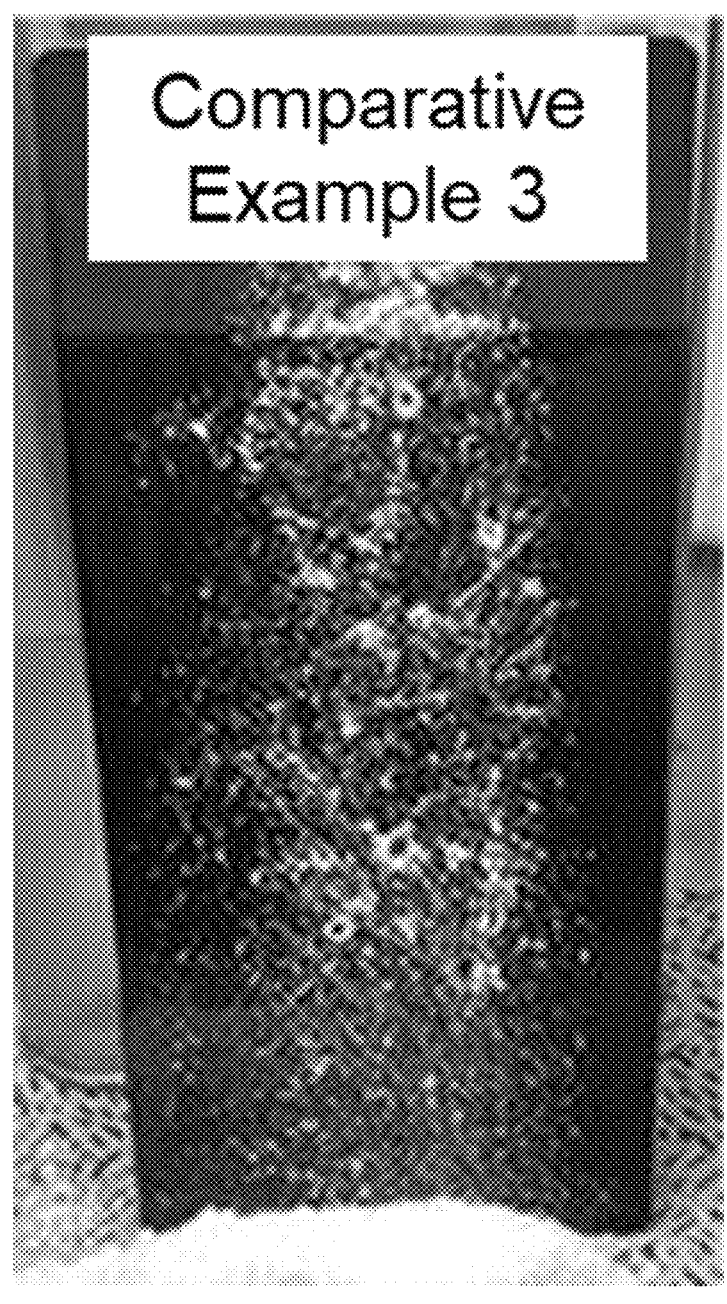
FIG. 2C shows a result of a dust reduction performance test for a clear coating composition prepared with the composition of Comparative Example 3.
Figure 2D:
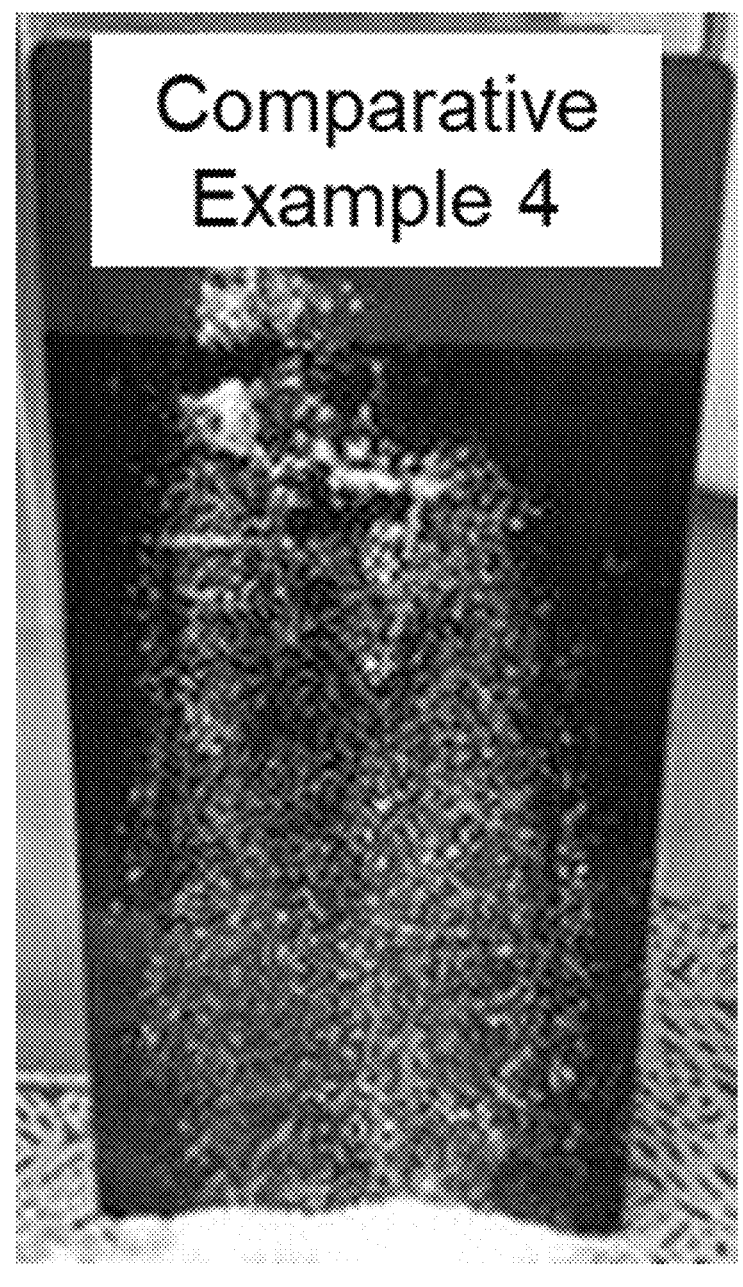
FIG. 2D shows a result of a dust reduction performance test for a clear coating composition prepared with the composition of Comparative Example 4.

Referring to FIGS. 1, 2A to 2D, and Table 2, it can be seen that Comparative Example 1, which does not include single-walled carbon nanotubes and a dispersion stabilizer, has a large surface resistance compared to Example 1, and thus has no dust reduction performance.

In Comparative Example 2, the content of single-walled carbon nanotubes was increased compared to Example 1 to secure dust reduction performance, but it was confirmed that the amount of single-walled carbon nanotubes was too high, resulting in reduced gloss and poor repainting adhesion.

It can be seen that Comparative Example 3 has a lower content of single-walled carbon nanotubes compared to Example 1, so the dust reduction performance was inferior.

In Comparative Example 4, an appropriate single-walled carbon nanotube was added, but the dispersion stabilizer was not applied, so the single-walled carbon nanotube was not sufficiently dispersed in the coating film, thereby confirming that the dust reduction performance was insignificant.

Therefore, the clear coating composition for reducing dust, according to the present disclosure, provides a clear coating composition that can reduce dust in the coating film by applying single-walled carbon nanotubes to the clear coating to prevent static electricity, thereby maximally reducing the generation of static electricity and adsorbing dust. It is possible to maximize the improvement of vehicle merchantability by preventing dust adsorption and removing dust while driving while reducing static electricity as much as possible.

Although the embodiment of the present disclosure has been described above, it will be understood by those skilled in the art that the present disclosure may be implemented in other specific forms without changing the technical spirit or essential features thereof. Therefore, it should be understood that the embodiments described above are illustrative in all respects and not restrictive.

What is claimed is:

1. A clear coating composition comprising:
45% to 55% by weight of an acrylic resin;
20% to 30% by weight of a melamine resin;
0.2% to 0.3% by weight of a single-walled carbon nanotube;
0.5% to 1.0% by weight of a dispersion stabilizer;
8% to 13% by weight of an additive; and
12% to 25% by weight of a solvent,
wherein the additive comprises:
   2% to 3% by weight of a light stabilizer;

2% to 4% by weight of a surface conditioning agent; and
   4% to 6% by weight of an anti-flow agent, based on a total weight of the clear coating composition.

2. The clear coating composition of claim 1, wherein the single-walled carbon nanotube has a diameter in a range of 1 nm to 2 nm.

3. The clear coating composition of claim 2, wherein the single-walled carbon nanotube has a length in a range of 5 μm to 50 μm.

4. The clear coating composition of claim 1, wherein the single-walled carbon nanotube has a length in a range of 5 μm to 50 μm.

5. The clear coating composition of claim 1, wherein the dispersion stabilizer comprises a polycarboxylic acid-modified compound.

6. The clear coating composition of claim 1, wherein the solvent comprises:
3% to 6% by weight of an ether-based solvent;
1% to 4% by weight of an alcohol-based solvent; and
8% to 15% by weight of an aromatic hydrocarbon-based solvent based on the total weight of the clear coating composition.

7. The clear coating composition of claim 1, wherein the clear coating composition has a surface resistance of $10^6 \Omega$ or less.

8. The clear coating composition of claim 1, wherein a gloss of the clear coating composition measured at 20° is 85 or more.

9. A clear coating composition comprising:
45% to 55% by weight of an acrylic resin;
20% to 30% by weight of a melamine resin;
0.2% to 0.3% by weight of a single-walled carbon nanotube;
0.5% to 1.0% by weight of a dispersion stabilizer;
8% to 13% by weight of an additive; and
12% to 25% by weight of a solvent,
wherein the solvent comprises:
   3% to 6% by weight of an ether-based solvent;
   1% to 4% by weight of an alcohol-based solvent; and
   8% to 15% by weight of an aromatic hydrocarbon-based solvent based on a total weight of the clear coating composition.

* * * * *